(12) United States Patent
Veltrop et al.

(10) Patent No.: US 9,174,236 B2
(45) Date of Patent: Nov. 3, 2015

(54) RODLESS DISPENSER

(71) Applicant: Prince Castle LLC, Carol Stream, IL (US)

(72) Inventors: Loren Veltrop, Chicago, IL (US); Karl Heinze, West Chicago, IL (US); Edward Eaton, Eola, IL (US); Brian W. Mathews, Waterman, IL (US); Eugene L. Di Monte, Aurora, IL (US)

(73) Assignee: Prince Castle LLC, Carol Stream, IL (US)

( * ) Notice: Subject to any disclaimer, the term of this patent is extended or adjusted under 35 U.S.C. 154(b) by 0 days.

(21) Appl. No.: 14/529,882

(22) Filed: Oct. 31, 2014

(65) Prior Publication Data

US 2015/0053724 A1  Feb. 26, 2015

Related U.S. Application Data

(63) Continuation of application No. 13/592,576, filed on Aug. 23, 2013, now Pat. No. 8,899,451.

(51) Int. Cl.
| | |
|---|---|
| *B05C 17/01* | (2006.01) |
| *B65D 83/00* | (2006.01) |
| *F16H 19/00* | (2006.01) |
| *F16H 19/06* | (2006.01) |

(52) U.S. Cl.
CPC ........ *B05C 17/0126* (2013.01); *B65D 83/0033* (2013.01); *F16H 19/006* (2013.01); *F16H 19/0636* (2013.01)

(58) Field of Classification Search
CPC .................................................. B05C 17/0126
USPC .................................. 222/390–392, 327, 386
See application file for complete search history.

(56) References Cited

U.S. PATENT DOCUMENTS

| | | | |
|---|---|---|---|
| 1,718,596 A | 6/1929 | Smith | |
| 2,634,692 A | 4/1953 | Sherbondy | |
| 3,782,598 A | 1/1974 | Basa | |
| 4,024,994 A | 5/1977 | Davis, Jr. | |
| 4,318,499 A | 3/1982 | Hamilton | |
| 5,064,098 A | 11/1991 | Hutter et al. | |
| 5,295,614 A | 3/1994 | Chang | |
| 5,730,330 A | 3/1998 | Reading | |
| 6,260,737 B1 | 7/2001 | Gruendeman | |

(Continued)

FOREIGN PATENT DOCUMENTS

| | | |
|---|---|---|
| DE | 3513880 | 10/1986 |
| DE | 4216541 | 11/1993 |

(Continued)

*Primary Examiner* — Paul R Durand
*Assistant Examiner* — Vishal Pancholi
(74) *Attorney, Agent, or Firm* — Andrus Intellectual Property Law, LLP (57) ABSTRACT

A dispenser for viscous, extrudable materials uses a sprocket-driven push chain that is drawn from a chain magazine responsive to actuation of a user trigger. The sprocket for the chain is driven by a toothed wheel, which is driven by a first, ratcheting drive pawl, which is actuated by the trigger. A second ratcheting locking pawl prevents the toothed wheel and hence the chain sprocket from rotating backward when the trigger is released. A single "button" or actuator can be actuated by one hand of a user while the user's other hand grasps a chain retractor to pull an extended chain back to a starting position whereat the dispenser can be reloaded.

20 Claims, 6 Drawing Sheets

(56) References Cited

U.S. PATENT DOCUMENTS

| | | |
|---|---|---|
| 6,321,945 B1 | 11/2001 | Girouard et al. |
| 6,382,466 B1 | 5/2002 | Schneider et al. |
| 6,386,401 B1 | 5/2002 | Dodd et al. |
| 6,981,621 B2 | 1/2006 | Brandeis et al. |
| 7,073,691 B2 | 7/2006 | Rumrill |
| 8,376,193 B2 | 2/2013 | Veltrop et al. |
| 8,381,950 B2 | 2/2013 | Veltrop et al. |
| 2005/0145653 A1 | 7/2005 | Brandeis et al. |
| 2008/0264971 A1 | 10/2008 | Harre et al. |
| 2009/0008615 A1 | 1/2009 | Young et al. |
| 2009/0224006 A1 | 9/2009 | Post et al. |
| 2011/0168737 A1 | 7/2011 | Veltrop et al. |
| 2011/0168741 A1 | 7/2011 | Veltrop et al. |
| 2011/0168742 A1 | 7/2011 | Veltrop et al. |

FOREIGN PATENT DOCUMENTS

| | | |
|---|---|---|
| GB | 2076473 | 12/1981 |
| JP | 2007289856 | 11/2007 |

RODLESS DISPENSER

CROSS-REFERENCE TO RELATED APPLICATIONS

This application is continuation of U.S. application Ser. No. 13/592,576, filed Aug. 23, 2012, which application was published on Feb. 27, 2014 as U.S. Publication No. US20140054327, the contents of which are incorporated herein by reference in its entirety.

RELATED APPLICATIONS

This application incorporates by reference the contents of co-pending patent application Ser. No. 12/684,597, filed Jan. 8, 2010, entitled "Rodless Dispenser." This application also incorporates by reference the contents of co-pending patent application Ser. No. 12/703,613, filed Feb. 10, 2010, and which is entitled "Piston and Piston Rod for a Rodless Dispenser." Also incorporated by reference is application Ser. No. 12/703,471 filed Feb. 10, 2010, and entitled, "Rodless Dispenser for Extrudable Materials Having a Contents Indicator."

BACKGROUND

Mechanical dispensers for viscous or extrudable materials include common, piston-type caulking guns found in any hardware store as well as small, hand-held devices for rolling up a flexible tube, such as the tubes that dispense toothpaste. Most extrudable material dispensers employ a piston attached to one end of an elongated piston rod. The piston is advanced through a half or partial-cylinder holder, the shape of which is reminiscent of a trough, the function of which is to hold a cylindrical canister of extrudable material.

Extrudable material in a canister is forced from the canister through a canister tip by driving a canister-internal piston installed into the "bottom" of the canister. The piston in the bottom of the canister is hereafter referred to as a canister piston.

The canister piston drives extrudable material from the canister when the canister piston is driven through the canister by the piston attached to the piston rod. The piston rod is driven by a pistol grip mechanism that forms part of the dispenser. The pistol grip mechanism can be attached to either a ratcheting or ratchetless transmission device. Actuation of the pistol grip causes the piston rod to be advanced into the cylinder, which in turn drives the first piston (attached to the connecting rod) into the second piston (in the bottom of a canister of extrudable material) forcing extrudable material from the dispensing tube. As the first piston moves away from the transmission device and into the dispensing tube, extrudable material is forced from the tip of the canister.

A problem with prior art caulking guns or other dispensers for extrudable materials is that the push rod is relatively long and extends outwardly to make the dispenser unwieldy. The extended rod also makes the device difficult to store or set down between uses, especially when such devices are used in close quarters, as often happens when the devices are used in restaurants to dispense condiments and other extrudable food products. A dispenser for dispensing extrudable material which eliminates the push rod would be an improvement over the prior art.

DETAILED DESCRIPTION

Figure 1:
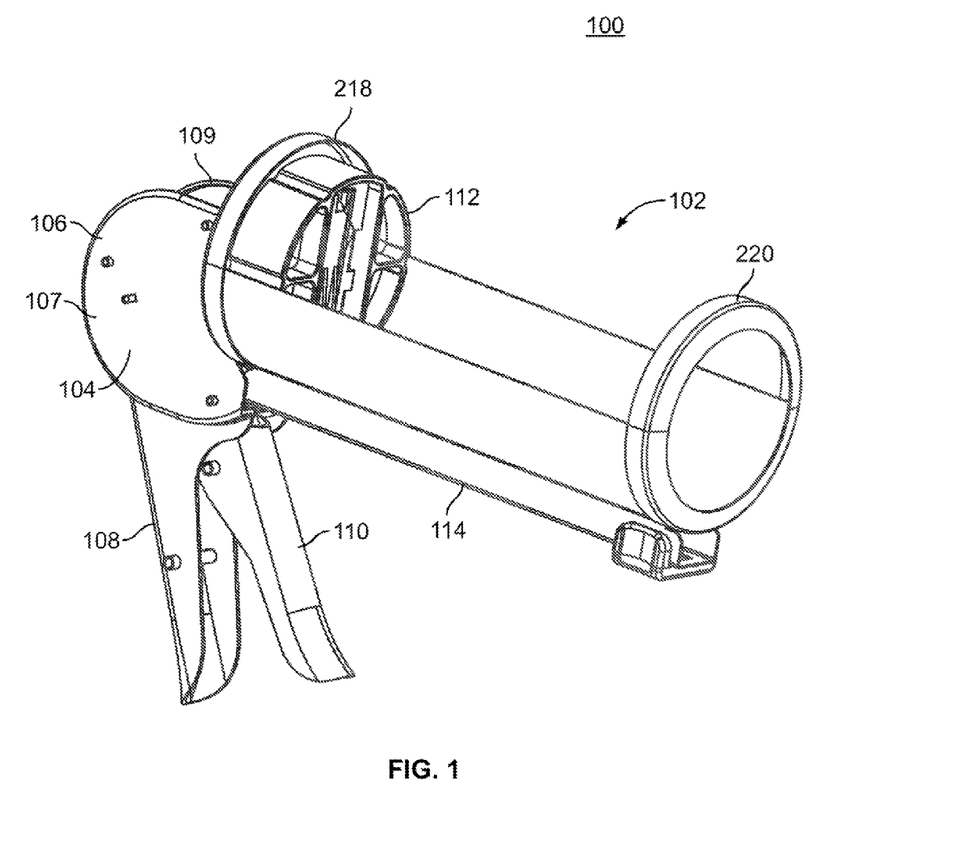
FIG. 1 is a perspective view of an alternate embodiment of a rodless dispenser.

Referring to FIG. 1, the rodless dispenser 100 is comprised of an elongated tube support 102, a push chain drive mechanism 104 located inside a housing 106. The housing 106 is attached to the elongated tube support 102. A handle 108 is formed as part of or which is attached to the housing 106 and an actuating trigger 110. The housing 106 has right and left substantially planar sides 107, 109, which cover and protect components inside the housing 106. A piston 112 is attached to and driven by a push chain, not visible in FIG. 1. At least part of the push chain is stored in a push chain magazine 114 attached to or formed as part of the tube support 102.

When the trigger 110 is pulled toward or into the handle 108, the piston 112 advances incrementally into the tube support 102. When a tube of extrudable material is placed into the tube support, the piston 112 will drive the material from the tube so that the material can be dispensed. A pair of ratcheting pawls inside the housing, which comprise the drive mechanism, are configured to allow the piston to be advanced incrementally with each actuation of the trigger and held in position. The drive mechanism thus advances the piston yet prevents it from retreating in response to the opposing force that the piston "sees" when it pushes against extrudable material.

When the piston needs to be retracted, such as when a tube needs to be removed from the tube support, the ratcheting pawls are configured to be released together by a single actuator. The actuator that releases both pawls, and which releases the piston, is embodied as one end of a pawl that is configured to hold the piston in place.

Figure 2:
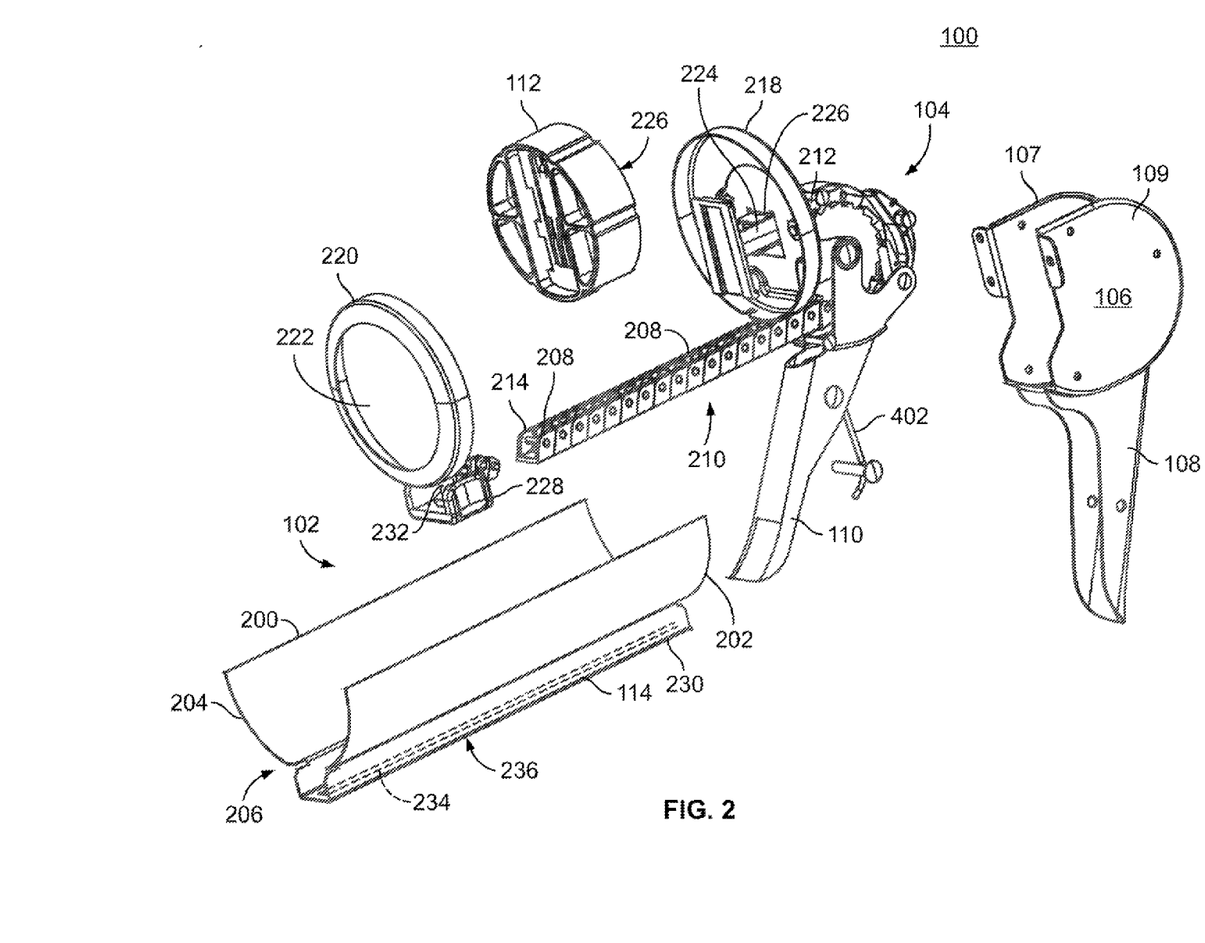
FIG. 2 is an exploded view of the rodless dispenser.

FIG. 2 is an exploded view of the rodless dispenser 100. The tube support 102 can be seen to be comprised of a roughly half cylinder or semi-cylinder 200 having first and second ends, 202, 204. The push chain magazine 114 is formed from a trough 206 located at the bottom of the semi-cylinder 200. A substantially round end panel 218 is sized, shaped and arranged to receive and be affixed to the first end 202 of the semi-cylinder 200. The end panel 218 is considered herein to comprise a first end of the support tube 102. A tube-retaining ring 220 having a centrally-located opening or hole 222 is attached to the second end 204 of the semi-cylinder 200 and forms a second end of the tube support 102.

Several, substantially U-shaped push chain links 208 are joined to each other to form a push chain 210 having first and second opposing ends 212, 214. The first end 212 of the chain 210 is attached to a bottom end of a piston rod 224. The piston rod 224 is attached to the bottom side 226 of the piston 112, i.e., the side of the piston 112 oriented toward the housing 106 and drive mechanism 104. The first end 212 of the chain 208 and the piston rod 224 extend through a rectangular hole or opening 226 formed in the substantially circular-shaped end panel 218.

Inside the housing 106, the chain 210 and its links 208 wrap part way around a push chain sprocket not visible in FIG. 2, and extend into the magazine 114. Inside the magazine, 114, the second end 214 of the push chain 210 is attached to a substantially U-shaped push chain retractor 228.

The U-shaped push chain retractor 228 is formed to fit over the vertical side surfaces 230 of the magazine 114. The push chain retractor 228 is thus configured to be graspable, i.e., capable of being grasped, by a thumb and an index finger or other digit. The retractor 228 is also formed with a post or tab 232 that extends upwardly through an elongated slot 234 formed into the bottom surface 236 of the magazine 114. Grasping the retractor 228 and sliding it or translating the retractor 228 back and forth along the length of the magazine 114 thus moves the chain 210 and its links 208 into and out of the magazine 114, so long as the pawls described herein are disengaged to allow the chain to move freely.

Each of the chain links 208 is substantially U-shaped. Each link has a "first" side that opens into the U-shaped link. The first side is also sized and shaped to receive a "tooth" of a chain sprocket. A second side is substantially planar.

The links are sized, shaped and arranged such that the first sides of the links are able to rotate or fold toward each other, enabling the links and the chain they form to wrap around a chain sprocket. The first sides of the links are not able to rotate or fold away from each other in the opposite direction but instead lock to become rigid and substantially columnar, as long as the links are urged to rotate the open sides away from each other.

Figure 3:
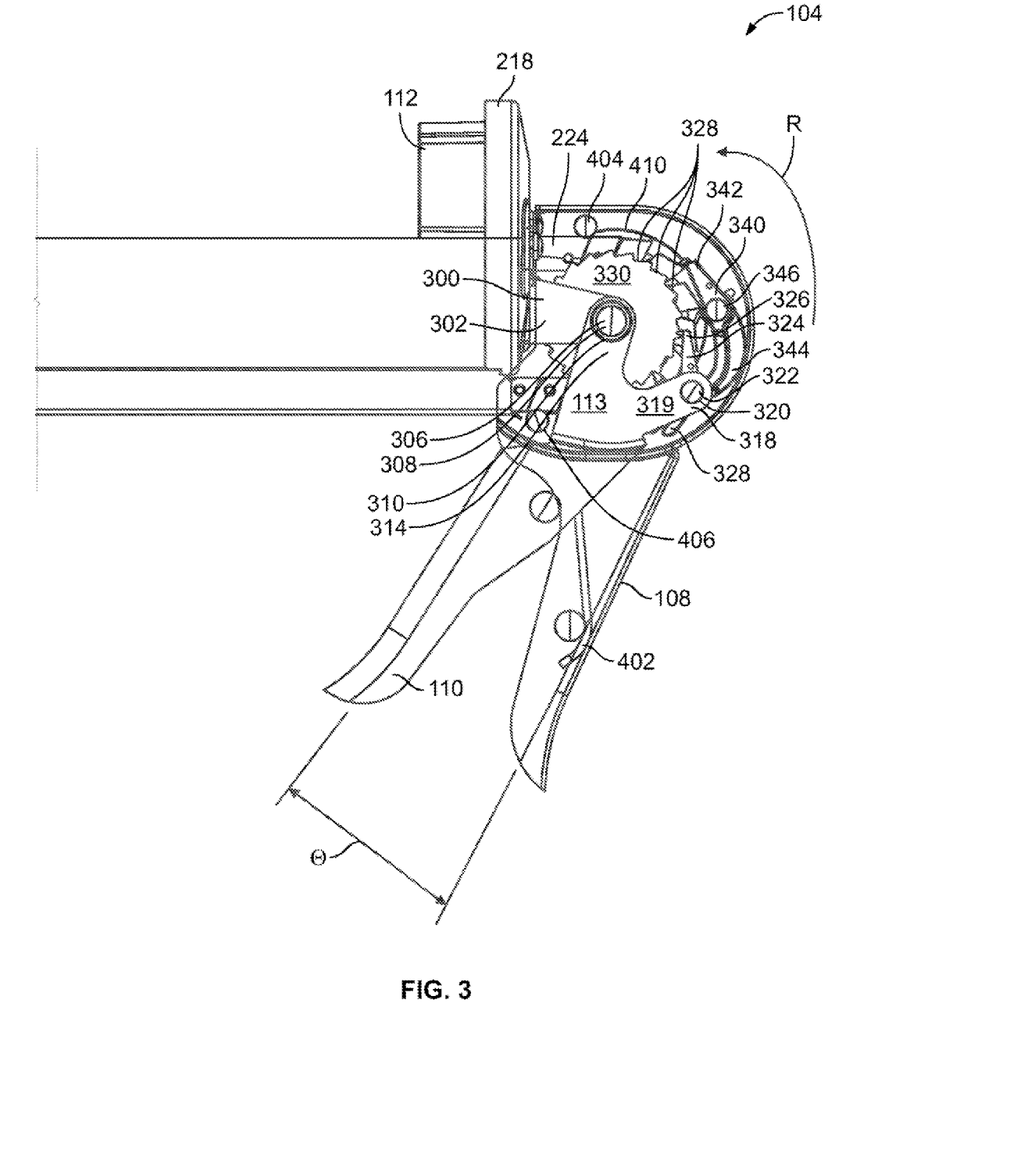
FIG. 3 is a left side view of a drive mechanism.

FIG. 3 is a side view of the drive mechanism 104. The drive mechanism 104 is shown inside the housing 106, but the left side 109 of the housing is shown as being removed in FIG. 3 in order to reveal components of the drive mechanism 104.

A substantially U-shaped horizontal axle support 300 is attached to and extends away from the first end 218 of the tube support 102 and part way into the housing 106. The left and right (first and second) sides 302, 304 of the axle support 300 hold corresponding ends of a first axle 306, which extends into the plane of FIG. 3.

The first end 308 of axle 306 is engaged with a hole or opening 310 formed into the first end 314 of the trigger 110. The trigger 110 extends downwardly at an angle theta relative to the handle 108.

The first end 314 of the actuating trigger 110 is formed or provided with a substantially U-shaped drive pawl support arm 318 having a slot between the opposing and substantially parallel sides 319 of the support arm 318. The drive pawl support arm 318 and its sides 319 extend laterally away from the axle 306 and opening 310 in the first end 314 of the trigger 110 such that rotation of the trigger 110 around the axle 306 also rotates the entire drive pawl support arm 318 through the same angle of rotation.

The far or distal ends of the sides 319 of the drive pawl support arm 318 are provided with concentric holes 320 sized, shaped and arranged to receive a drive pawl support axle 322. The drive pawl support axle 322 extends into both of the sides 319 of the U-shaped drive pawl support arm 318.

The drive pawl 324 fits between the sides 319 of the drive pawl support arm 318. The drive pawl 324 has a hole, not visible in the figures, through which the drive pawl axle 322 extends and by which the drive pawl 324 is rotatably supported in the drive pawl support arm 318. Rotatably supported in the drive pawl support arm 318 means that the drive pawl 324 is able to rotate on, or rotate with, the drive pawl support axle 322 while the drive pawl 324 is inside the U-shaped drive pawl support arm 318.

The drive pawl 324 has a first end 326 that is able to reach into and engage notches 328 in a fine-toothed drive wheel 330 responsive to the drive pawl rotation through the small angle. (The terms, "fine-toothed drive wheel" "drive gear" and "drive wheel" are used interchangeably hereinafter.) An opposing second end 328 of the drive pawl 322 extends downwardly from the drive pawl support arm 318.

The toothed wheel 330 is circular. Its outside surface is formed or provided with equidistant, equally-spaced notches 328. The drive pawl 322 is biased by a torsion spring 323, best seen in FIG. 4, such that the first end 324 is normally engaged with a notch 328.

When the second end 113 of the trigger 110, which is attached to the first axle 306, is pulled toward the handle 108, the trigger 110 rotates around the geometric axis of the first axle 306. Such actuation of the trigger 110 also rotates the drive pawl support arm 318 in the same direction. Rotation of the drive pawl support arm 318 in the direction of R will of course also rotate the drive pawl support axle 322 and the drive pawl 324 in the same direction. Since the first end 326 of the drive pawl 324 is biased to engage notches in the drive wheel 330, rotation of the actuating trigger 110 around the first axle 306 rotates the drive wheel 330 in the same direction. The teeth in the drive wheel are cut or formed at an angle, such that the drive pawl is able to exert force on the drive wheel in one direction only.

As used herein, a ratchet is a mechanism comprised of a bar or pawl, which drops into successive inclined teeth of a gear so that one-way motion can be imparted to the gear by movement of the bar or pawl into the teeth of the gear.

The trigger 110 is biased by a spring 402 inside the handle and inside the trigger to move away from the handle 108. The spring 402 is preferably a torsion spring, i.e., a spring that provides torque, but could also be provided by a compression spring, i.e., a spring that provides either a compressive force or a tensile force.

When the trigger 110 is pulled toward the handle 108, the drive pawl engages a tooth in the drive gear and rotates the gear by the rotation of the trigger 110 around the axis of the first axle 306. When the trigger is released, the drive pawl and the driver rotate in an opposite direction, however, because of the angle at which the teeth in the drive wheel are oriented, the first end of the drive pawl slips over the teeth in the drive gear without moving the drive gear. The drive pawl thus acts as a ratchet to the drive gear. Repeatedly squeezing the trigger 110 toward the handle 108 will thus rotate the drive wheel in one direction.

Still referring to FIG. 3, there is a second pawl 340 that is rotatably supported on a third axle. The third axle 346 is supported by the sides 107, 109 of the housing 106.

The second pawl 340, which is considered to be a locking/unlocking pawl, has a first end 342 that extends away from the third axle 346 and configured to extend into engagement with the notches 328 on the drive gear 330. An opposite second end 344 of the second pawl 340 extends away from the third axle 346.

The third axle 346 fits into a hole formed in the second pawl 340. The third axle 346 rotatably supports the second pawl 340. The third axle 346 also supports a bias spring 345, which urges the first end 342 of the second pawl 340 into engagement with notches 328 on the drive gear 330 such that the first end 342 of the second pawl 340 provides a second ratchet for the drive wheel 330. The second pawl 340 thus prevents the drive wheel 330 from "backing up" or reversing its rotation when the trigger 110 is released and moves away from the handle 108.

The second pawl 340 is able to rotate through a small angle responsive to a compressive force applied to the second end 344 of the second pawl 342. A compressive force, which can be provided by a user's finger or thumb, needs only be sufficient to overcome the bias applied to the second pawl 340 by the spring 345.

The third axle 346, which extends through the second pawl 340, extends into and out of the plane of FIG. 3. The opposite ends of the third axle are supported in the right and left sides 107, 109 of the housing 106.

Figure 4:
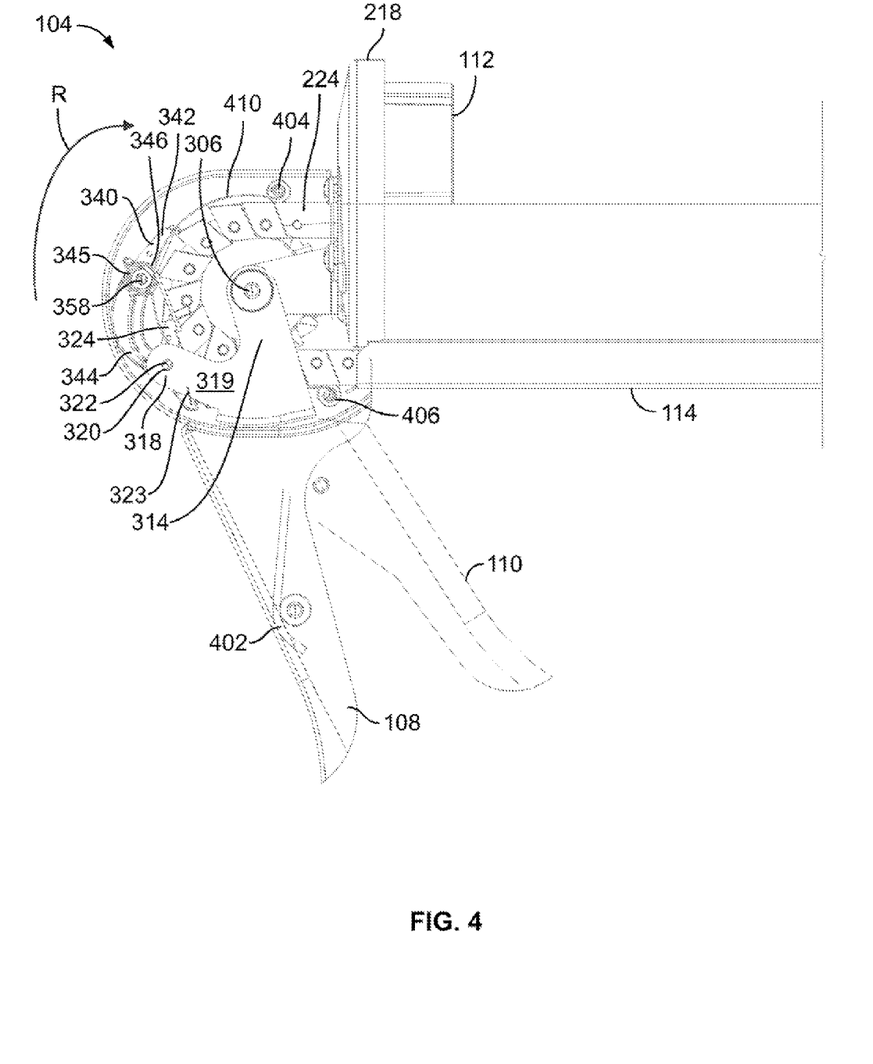
FIG. 4 is a right side view of the drive mechanism.

FIG. 4 is a right-side view of the drive mechanism 104. A bias spring 345 is wound around the third axle 346. It provides a bias force that urges the first end 342 of the second pawl 340 into engagement with notches 328 in the drive wheel 330.

As the second pawl is arranged and structured, the bias applied by the spring 345 maintains the first end 342 of the second pawl in contact with a notch 328. The engagement of the second pawl to the toothed wheel 330 keeps the toothed wheel 330 from rotating backwardly, i.e., the second pawl limits the direction of rotation of the toothed wheel. As long as the first end 342 of the second pawl is engaged with a notch 328, the toothed wheel 330 is unable to rotate against or counter to the direction that the toothed wheel is driven by the first pawl. In other words, the toothed wheel can only rotate in the "R" direction.

Both the first end 342 and the second end 344 of the second pawl 340 extend away from the third axle 346 but not necessarily in opposite directions. In a preferred embodiment as shown, the second end of the second pawl is curved such that the second end 344 of the second pawl is proximate to the second end 326 of the first pawl (not visible in FIG. 4) such that depressing or forcing the second end 344 of the second pawl 340 inwardly as shown causes the second end of the second pawl into engagement with the second end 326 of the first pawl.

Pushing the second end of the second pawl such that the second end of the second pawl also pushes the second end of the first pawl inwardly, i.e., toward the first axle, causes the first end of both pawls to disengage from the respective notches in the drive wheel. Stated another way, the first end of the second pawl and the first end of the first pawl are both disengaged from the toothed wheel 330 when a force is applied to the second end of the second pawl sufficient to overcome the bias applied to both pawls by their respective actuating bias springs.

Figure 5:
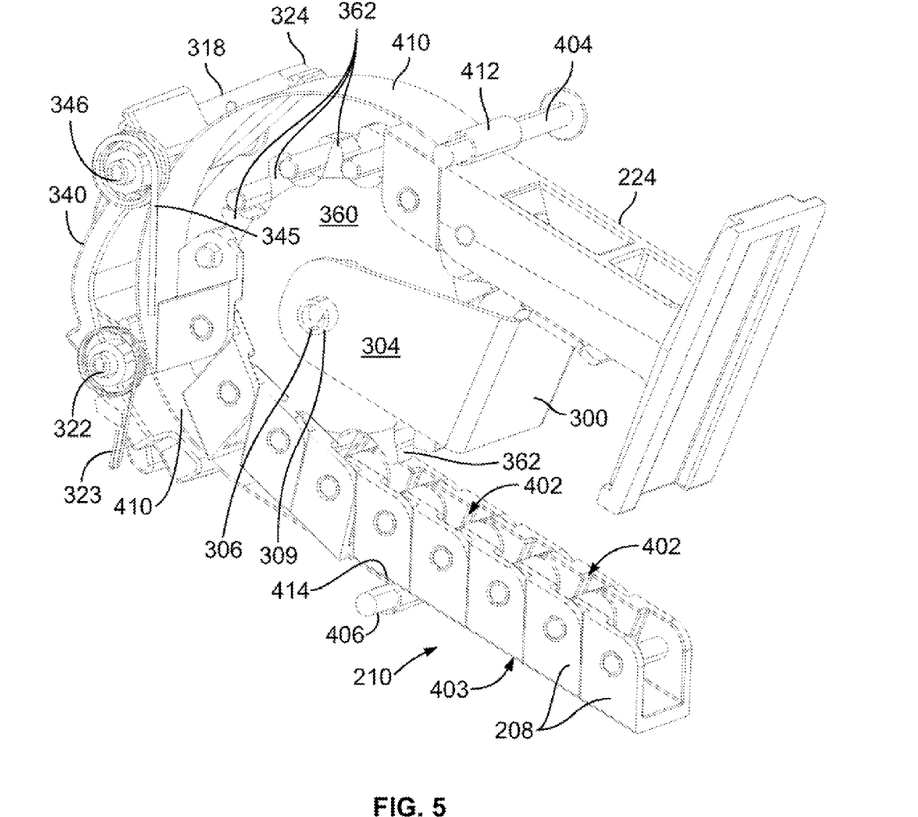
FIG. 5 is a perspective view of the right side of the drive mechanism.

Referring now to FIG. 5, a toothed sprocket 360 is attached to and rotates with the toothed wheel 330 on the same first axle 306. The second end 309 of first axle 306 is supported in the housing 106 by the second side 304 of the axle support 300.

The sprocket 360 is formed to have sprocket teeth 362, which are sized, shaped and arranged to engage or fit into the open or first side 402 of the U-shaped links 208 of the push chain 210. The attachment of the toothed wheel 330 to the sprocket 360 means that rotation of the toothed wheel 330 will also rotate the sprocket 360. As long as the first sides 402 of the push chain links 208 are engaged to the sprocket teeth 362, rotation of the sprocket 360 will drive and retract the first end 214 of the push chain 210 into and out of the tube support 102, pushing and pulling the piston 112 at the same time.

The links of the chain 210 are kept engaged to the sprocket and its teeth by two push chain retainers 404, 406. In a preferred embodiment and as shown in FIG. 5, the push chain retainers 404, 406 are columns or pins that extend outwardly from at least one of the two sides 107, 109 of the housing 106. Alternate embodiments include pads or tabs that extend over the push chain links just ahead of where the push chain links engage the sprocket teeth so that the chain links are able to travel past the retainers and engage the sprocket.

The push chain retainers 404, 406 are located relative to the sprocket and sprocket teeth in order to keep portions of the push chain 400 that wrap around the sprocket 360 in place, i.e., keep the chain links engaged to the sprocket teeth. The bottom or second push chain retainer 406 also functions to limit the rotational travel of the actuating trigger 110.

As best seen in FIG. 4, portions of the push chain that extend outwardly or away from the sprocket, i.e., toward the first end of the tube support, are substantially straight. Those links, i.e., the ones beyond the push chain retainers, are considered herein to be "fully unfolded." The fully unfolded links in the "top" portion of the chain, i.e., the portion of the chain that extends into the support tube 102, are fully unfolded and able to support a compressive load, including the force applied to the first section of straight chain that extends from the top or first push chain retainer 404 forwardly to the second end of the push rod. Stated another way, the push chain retainers 404, 406 are located and fixed at locations along the length of the chain where the straight sections, i.e. the chain section inside the tube support and inside the chain magazine begin to bend around the sprocket. The links that engage the sprocket thus form a third intermediate or curving section of push chain links. The third or intermediate curving section is considered herein to be the number of chain links that are engaged with teeth of the sprocket. By virtue of their engagement with the circular sprocket, the links forming the intermediate section cannot be straight and are, in fact, curved.

FIGS. 3, 4 and 5 show a push chain guide 410, best seen in FIG. 5. It is preferably embodied as a thin, flat curved strip of metal having a radius of curvature substantially equal to the radius of curvature described by the sprocket and push chain links engaged therewith. The opposing first and second ends 412, 414 of the push chain guide 410 are mounted to or attached to the two aforementioned push chain retainers 404, 406. The push chain guide 410 facilitates "threading" or feeding the push chain 210 and its links 208 into engagement with the sprocket teeth during initial assembly of the drive mechanism 104. At assembly the second end 214 of the push chain 210 can be fed or inserted into the opening in the first end 218 of the support tube 102 and then "fed" into engagement with the sprocket teeth. The push chain guide 410 thus ensures that the open sides 402 of the push chain links 208 will engage teeth 362 on the sprocket 360.

Referring to FIGS. 4 and 5, actuating the second end 344 of the second pawl 340, both pawls will disengage the toothed wheel, allowing the sprocket to rotate "backwardly" allowing the push chain 210 to be wrapped around the sprocket and have the second end 214 of the chain 210 pushed into the magazine 104. When the entire length of the push chain 210 is installed, the piston rod is attached to the first end 212 of the push chain 210.

Figure 6:
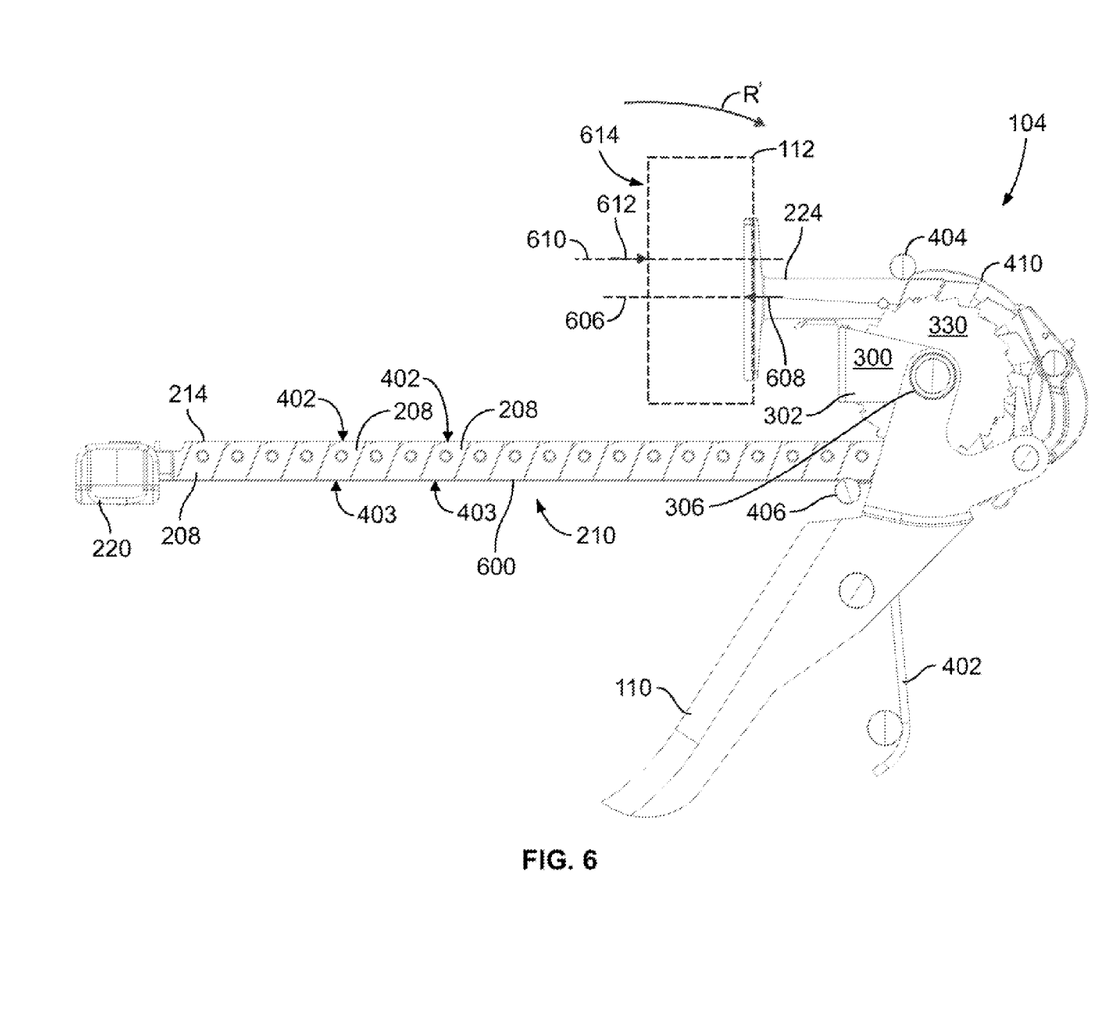
FIG. 6 is a left side view showing the push chain, piston and drive mechanism.

For completeness, FIG. 6 shows a side view of the rodless dispenser drive mechanism 104, push chain 210 and piston rod 224 but with the push chain 210 removed from the magazine to show that the back or second sides of the links are able to provide a substantially straight, flat or planar surface when the first sides 402 of links 208 are rotated away from each other. The push chain 210 is shown as it would rest in the magazine 114, with several links 208 that are adjacent to each other, "fully unfolded."

When the open, first sides 402 of two more links are rotated away from each other to be fully unfolded, those chain links form a substantially straight and substantially column-like, rod-like structure. Such chain links are able to provide a compressive force along a line formed by the links that are unfolded, i.e., urged to rotate in a direction opposite the direction that the chain links are able to rotate toward each other. When the links are unfolded, the open or "first" sides 402 of each chain link 208 face upwardly. The opposing second sides 403, which are shown as edges, are depicted by straight line segments of each link 208.

The links 208 that are shown wrapped part way around the sprocket 360 are partly folded toward each other. Stated another way, the links are able to rotate toward each other as they wrap part way around the sprocket.

The chain links 208 that are to the left of the lower push chain retainer 406 are fully unfolded relative to each other. Since the second side 403 of each link is planar, the second sides of the fully unfolded links that are adjacent to each other and to the left of the push chain retainer 406 provide an extended flat or planar surface 600. The planar surface 600 formed by second sides 403 of two or more fully unfolded chain links 208 is able to freely slide over the push chain retainers 404 and 406.

The piston rod 224 has a geometric center line 606. The piston 112 itself also has a center line 610. When the piston 112 is urged against an extrudable material by force 608 applied to the piston 112 by the piston rod 224, or when the piston 112 is urged against another, different piston inside a tube of extrudable material not shown, an opposing force 612 is distributed across the face 614 of the piston 112 driven by the piston rod 224. The opposing force 612 on the piston 112 effectively acts through the center line 610 of the piston 112.

When the T-shaped piston rod 224 is properly attached to the bottom of the piston 112, driving force 608 from the chain 210 is effectively transmitted into the connecting rod 224 through the geometric center line 606 of the piston rod 224. The piston rod 224 is attached to the piston such that the force 608 applied to the piston 112 from the piston rod 224 will be offset from the center 610 of the piston 112 such that the force 608 from the piston rod 224 is applied to the piston 112 below the center line 610 of the piston 112, as described in the aforementioned patent application Ser. No. 12/703,613, filed Feb. 10, 2010, and which is entitled "Piston and Piston Rod for a Rodless Dispenser, incorporated herein by reference. Since the opposing force from extrudable material 612 acts in an opposite direction, and at a location above the point of application of the force 608 driving the piston 224 into the extrudable material, the piston 112 will tend to rotate in the tube of extrudable material. The direction of rotation R' (read as "r" prime) will be clockwise as the piston 112 is shown in FIG. 6. A rotation of the piston 112 and piston rod 224 "into" the chain links will tend to urge the chain links 208 that extend forwardly from the top of the toothed drive wheel 330 to their fully unfolded position keeping them locked and able to support/provide the force 608 to the piston 112. Stated another way, the chain links connected to the slightly rotated piston 112 and slightly rotated piston rod 224 will be locked into their fully unfolded position just by the exertion of a force 608 on the piston 112 by the chain 210.

Replacing a tube of extrudable material is accomplished by the dual disengagement of the pawls, followed by or accompanied by retracting the chain 210. The chain is retracted simply by grasping the retractor and sliding the retractor 220 outwardly toward the second end 204 of the tube support while the pawls are held disengaged from the drive wheel 330. The dual disengagement of both pawls by the operation of a single actuator simplifies and facilitates the retraction of the piston 112 and push chain 210 into the magazine 114 and is an improvement over prior art.

The foregoing description is for illustration purposes only. The true scope of the invention is set forth in the claims.

What is claimed is:

1. A dispenser comprising:
a first pawl coupled to a first axle and configured to engage and disengage notches on a toothed wheel coupled to a second axle responsive to angular translation of the first pawl about the first axle, the first pawl being configured to drive the toothed wheel in a first direction responsive to engagement of the first pawl with a notch in the toothed wheel and angular translation of the first axle around the second axle in said first direction;
a second pawl coupled to a third axle, the second pawl having first and second portions, both of which extend away from the third axle, the first portion extending from the third axle toward the toothed wheel and configured to engage and disengage notches in the toothed wheel responsive to rotation of the second pawl around the third axle, the first portion being biased to engage notches on the toothed wheel, the first portion capable of being disengaged from the notches responsive to a force applied to the second portion of the second pawl;
the first pawl, toothed wheel and second pawl being configured such that engagement of the first end of the second pawl with notches in the toothed wheel allows the toothed wheel to be driven in the first direction by the first pawl but prevents the toothed wheel from rotating in an opposite second direction, disengagement of the first end of the second pawl from the toothed wheel responsive to a force applied to second end of the second pawl also causes the first pawl to disengage from the toothed wheel and thereby allows the toothed wheel to rotate in the second direction; and
an actuating trigger having first and second opposing ends, the first end being rotatably coupled to the first axle and including an arm configured to support the second axle, the actuating trigger configured to translate between first and second angular positions relative to the first axle and thereby cause the second axle to translate around the first axle between the first and second angular positions.

2. The rodless dispenser of claim 1, further comprising:
a sprocket having a plurality of teeth, the sprocket being attached to and configured to rotate with the toothed wheel;
a push chain having first and second ends and a plurality of chain links between said ends, the chain links and sprocket being configured such that at least some of the chain links wrap part way around the sprocket.

3. The rodless dispenser of claim 2, wherein the push chain, when wrapped part way around the sprocket, comprises first and second substantially straight sections of chain, the corresponding links of which are fully unfolded, the first and second substantially straight sections extending away from the sprocket, the push chain being additionally comprised of a curving third section of chain between the first and second substantially straight sections of chain, the curving third section being comprised of chain links that engage sprocket teeth, the curving third section extending part way around the sprocket, the rodless dispenser being additionally comprised of first and second push chain retainers fixed at locations proximate to where the first and second substantially straight sections of the chain meet the third section of the chain as the sprocket rotates and moves the chain.

4. The rodless dispenser of claim 2, wherein the push chain comprises first and second substantially straight sections of chain and a third section of chain that curves about the sprocket, and the first and second substantially straight sections of chain extend laterally away from the third section, substantially parallel to each other.

5. The rodless dispenser of claim 1, wherein the first pawl is biased into normal engagement with the toothed wheel independent of an angular position of the trigger.

6. A rodless dispenser comprising:
a push chain magazine;
a sprocket having a plurality of teeth, a push chain having first and second ends and a plurality of links between the first and second ends, at least one link of the plurality engaged with at least one tooth of the plurality of teeth, the first end being located in the magazine and capable of translating back and forth therein responsive to rotation of the sprocket, the second end of the push chain translatable towards and away from the sprocket;

a toothed wheel comprising: a plurality of notches coupled to the sprocket such that rotation of the toothed wheel causes rotation of the sprocket;

a first axis, at least one of the toothed wheel and the sprocket configured to rotate about the first axis;

a first pawl rotatable about a second axis and configured to engage and disengage notches of the toothed wheel responsive to angular translation of the first pawl about the second axis, the first pawl being, configured to rotate the toothed wheel and the sprocket in a first direction, responsive to engagement of the first pawl with a notch in the toothed wheel and an angular displacement of the second axis and drive pawl around the first axis in said first direction;

a second pawl having first and second portions, both of which extend away from a third axis about which the second pawl is rotatable, the first portion of the second pawl configured to engage and disengage notches in the toothed wheel responsive to rotation of the second pawl around the third axis, the first portion of the second pawl being biased to rotate on the third axle to engage the notches on the toothed wheel;

wherein a force applied to the second portion of the second pawl rotates the second pawl about the third axis and the first pawl about the second axis to disengage the first pawl and the second pawl from the toothed wheel, such that the toothed wheel and sprocket are rotatable in the second direction.

7. The dispenser of claim 6, further comprising a tube support configured to hold a tube containing extrudable material, the tube support having first and second ends, each end having an opening, the push chain extending through the opening in the second end of the tube support such that the second end of the push chain is translatable towards and away from the sprocket within the tube support.

8. The dispenser of claim 7, further comprising:
a piston inside the tube support and comprised of a piston head having a center and first and second opposing sides;
a piston rod having first and second opposite ends, the first end being attached to and extending from the second side of the piston at a first location on the second side of the piston, the second end of the piston rod being attached to the second end of the push chin, the piston rod having a length defined by the distance between the first and second ends of the piston rod.

9. The dispenser of claim 8, wherein the first location on the piston is offset from the center of the piston head.

10. The dispenser of claim 6, further comprising a push chain retractor comprising a post that extends through a slot, in the push chain magazine and attached to the push chain proximate the first end of the push chain.

11. The dispenser of claim 6, further comprising an actuating trigger having first and second opposing ends, the first end being rotatable about the first axis and including an arm comprising the second axis, the actuating trigger translatable between first and second angular positions relative to the first axis and thereby cause the second axis to translate round the first axis between the first and second angular positions.

12. The dispenser of claim 6, wherein the push chain comprises first substantially straight section of chain comprising the first end and a second substantially straight section of chain comprising the second end and a third section of chain that curves about the sprocket, and the first and second substantially straight sections of chain extend laterally away from the third section.

13. A dispenser comprising:
a wheel rotatable about a first axis, the wheel comprising a plurality of notches;
a first pawl pivotable about a second axis between a first position and a second position, wherein in the first position the first pawl engages the plurality of notches on the wheel and in the second position the first pawl disengages from the plurality of notches, the second axis angularly translatable about the first axis, and the first pawl being configured to drive the wheel in a first direction when the first pawl engages the notch and the second axis angularly translates about the first axis in the first direction; and
a second pawl pivotable about a third axis between a first position and a second position, wherein in the first position the second pawl being biased to the first position to engage and disengage the plurality of notches in the wheel responsive to rotation of the wheel in the first direction, wherein when the second pawl is in the first position, the second pawl prevents rotation of the wheel in a second direction about the first axis, the second direction opposite the first direction, and when the second pawl is moved to the second position, the second pawl disengages the plurality of notches and engages the first pawl to move the first pawl to the second position disengaged from the notch of the plurality of notches thereby permitting rotation of the wheel in the second direction.

14. The dispenser of claim 13, wherein the second pawl further comprises a second pawl first portion extending away from the third axis and a second pawl second portion extending away from the third axis, wherein the second pawl first portion is configured to engage and disengage the plurality of notches and a force applied to the second pawl second portion pivots the second pawl to the second position.

15. The dispenser of claim 14, wherein the first pawl comprises a first pawl first portion extending away from the second axis and a first pawl second portion extending away from the second axis, wherein the first pawl first portion is configured to engage and disengage the plurality of notches and when the second pawl is in the second position, the second pawl second portion engages the first pawl second portion to pivot the first pawl into the second position.

16. The dispenser of claim 13 further comprising:
a first axle arranged at the first axis and coupled to the wheel;
a second axle arranged at the second axis and coupled to the first pawl; and
a third axle arranged at the third axis and coupled to the second pawl.

17. The dispenser of claim 13, further comprising;
a sprocket having a plurality of teeth, the sprocket being attached to and configured to rotate with the wheel; and
a push chain haying first and second ends and a plurality of chain links between the first and second ends, the chain links and sprocket being configured such that at least some of the chain links wrap pan way around the sprocket.

18. The dispenser of claim 17, wherein the push chain comprises first substantially straight section of chain comprising the first end and a second substantially straight section of chain comprising the second end and a third section of chain that curves about the sprocket, and the first and second substantially straight sections of chain extend laterally away from the third section.

19. The dispenser of claim 17, further comprising:
wherein the push chain, when wrapped part way around the sprocket, comprises first and second substantially straight sections of the push chain, the corresponding links of which are fully unfolded, the first and second substantially straight sections extending away from the sprocket, the push chain being additionally comprised of a curving third section of chain between the first and second substantially straight sections of the push chain, the curving, third section being comprised of chain links that engage teeth of the plurality of teeth of the sprocket, the curving third section extending part way around the sprocket; and
at least one push chain retainer fixed at a location proximate to where at least one of the first substantially straight section and second substantially straight section meets the curving third section.

20. The dispenser of claim 13, further comprising, an actuating trigger having first and second opposing ends, the first end being rotatable about the first axis and including an arm comprising the second axis, the actuating trigger translatable between first and second angular positions relative to the first axis and thereby cause the second axis to translate round the first axis between the first and second angular positions.

\* \* \* \* \*